United States Patent
Isoda et al.

(10) Patent No.: US 7,268,513 B2
(45) Date of Patent: Sep. 11, 2007

(54) MOTOR/GENERATOR UNIT

(75) Inventors: Hitoshi Isoda, Tokyo (JP); Yoshihito Asao, Tokyo (JP); Masaki Kato, Tokyo (JP); Hiroyuki Akita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 105 days.

(21) Appl. No.: 11/312,563

(22) Filed: Dec. 21, 2005

(65) Prior Publication Data
US 2006/0158148 A1 Jul. 20, 2006

(30) Foreign Application Priority Data
Dec. 27, 2004 (JP) .................. P2004-376732

(51) Int. Cl.
*H02P 1/46* (2006.01)
(52) U.S. Cl. .................. 318/717; 318/109; 318/138; 310/58; 310/184
(58) Field of Classification Search ............... 318/717, 318/138, 109; 310/58, 184, 193
See application file for complete search history.

(56) References Cited

U.S. PATENT DOCUMENTS

| | | | |
|---|---|---|---|
| 6,713,888 B2 * | 3/2004 | Kajiura | 290/40 F |
| 6,975,080 B2 * | 12/2005 | Kitamura et al. | 318/109 |
| 6,979,927 B2 * | 12/2005 | Kometani et al. | 310/193 |
| 7,067,949 B2 * | 6/2006 | Kometani et al. | 310/184 |
| 7,208,918 B2 * | 4/2007 | Shirakawa et al. | 322/99 |
| 2003/0107287 A1 * | 6/2003 | Nishimura et al. | 310/180 |
| 2004/0012292 A1 * | 1/2004 | Kometani et al. | 310/184 |
| 2004/0232793 A1 * | 11/2004 | Fujita et al. | 310/156.43 |
| 2005/0093521 A1 * | 5/2005 | Nishimura et al. | 322/32 |
| 2005/0156543 A1 * | 7/2005 | Kitamura et al. | 318/109 |
| 2006/0284580 A1 * | 12/2006 | Kitamura | 318/268 |
| 2007/0035185 A1 * | 2/2007 | Asao et al. | 310/58 |
| 2007/0035186 A1 * | 2/2007 | Asao et al. | 310/58 |
| 2007/0035270 A1 * | 2/2007 | Kitamura et al. | 318/727 |

FOREIGN PATENT DOCUMENTS

JP   2003-225000 A   8/2003

* cited by examiner

*Primary Examiner*—Paul Ip
(74) *Attorney, Agent, or Firm*—Sughrue Mion, PLLC

(57) ABSTRACT

A motor/generator unit in which a motor/generator and an invertor part are integrated and the wiring of a field circuit part for supplying current to a winding on a rotor is rationalized. In a motor/generator unit in which a motor/generator body part having a field winding supplied with electricity via brushes and current-controlled by a semiconductor control device controlled by a control circuit part and an invertor power circuit part controlled by the control circuit part has the invertor power circuit part and the control circuit part mounted thereto, the brushes are disposed between the field winding and the armature winding on one side and the control circuit part on the other and the semiconductor control device is mounted on a control circuit mounting part on which the control circuit part is mounted.

16 Claims, 9 Drawing Sheets

MOTOR/GENERATOR UNIT

BACKGROUND OF THE INVENTION

1. Field of the Invention

This invention relates to a motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto.

2. Description of Related Art

Alternating current motor/generators for use in automotive vehicles of related art, generally, as shown in for example JP-A-2001-95103 (Patent Document 1), are mounted horizontally on the outside of an engine and connected to the engine by a belt and pulleys; an invertor for drive/generate-controlling the motor/generator is mounted remotely from the motor/generator; and the motor/generator and the invertor are connected by 3-phase wiring. And a field circuit part for controlling a field circuit is also mounted on the invertor.

And, in JP-A-2003-225000, as shown in FIG. 12 thereof, a construction is shown in which the motor/generator and the invertor are integrated.

Patent Document 1: JP-A-2001-95103 (FIG. 1 and description thereof)

Patent Document 2: JP-A-2003-225000 (FIG. 4, FIG. 7 and descriptions thereof)

In an ordinary motor/generator of the kind shown in Patent Document 1, it is necessary for an invertor for drive/generate-controlling the motor/generator to be mounted on the vehicle, and it has been necessary to provide a space for mounting the invertor separately from the space where the motor/generator is mounted.

Because of this, in recent years, as shown in Patent Document 2, air-cooled motor/generator units for use in automotive vehicles have been proposed in which the motor/generator and the invertor part are integrated and the provision of a separate space for mounting the invertor on the vehicle is rendered unnecessary.

When a motor/generator unit made by integrating a motor/generator and an invertor part is mounted inside an engine compartment in the proximity of an engine, although this is not mentioned in Patent Document 1, because it tends to be subjected to the vibration of the engine, and also is often exposed to water from outside, it is necessary for the invertor control circuit and the wiring connections between the circuits and parts relating to this control circuit to be made reliably resistant to vibration and insulated, and it is necessary to rationalize the various wiring connections; and, when the motor/generator and the invertor part are integrated, because the invertor control circuit and circuits and parts relating to this control circuit tend to suffer affects of magnetic flux from the rotor and the stator of the motor/generator unit, it is necessary for them to be made resistant to noise as well.

The present invention was made in view of the situation discussed above, and it is an object of the invention to, in the integrating of a motor/generator unit and an invertor part, achieve rationalization of the wiring of a field circuit part for supplying current to a rotor winding.

SUMMARY OF THE INVENTION

The invention provides a motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto, wherein the brushes are disposed between the field winding and the armature winding on one side and the control circuit part on the other and the semiconductor control device is mounted on a control circuit part mounting part on which the control circuit part is mounted.

The invention also provides a motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto wherein the brushes are disposed between the field winding and the armature winding on one side, and the control circuit part on the other, a field circuit component mounting part is present between the brushes and the control circuit part, the semiconductor control device and a flywheel diode parallel with the field winding are mounted on this field circuit component mounting part, and the semiconductor control device and the flywheel diode are connected on the field circuit component mounting part.

The invention further provides a motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto wherein a brush holder for holding the brushes has a field circuit component mounting part positioned between the field winding and the armature winding on one side and the control circuit part on the other and the semiconductor control device is mounted on this field circuit component mounting part.

Because a motor/generator unit according to the invention is a motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto wherein the brushes are disposed between the field winding and the armature winding on one side and the control circuit part on the other and the semiconductor control device is mounted on a control circuit part mounting part on which the control circuit part is mounted, the signal lines of control signals from the control circuit part to the semiconductor control device can be constituted with a wiring pattern on a board and thus rationalization of the wiring is possible. And because the control circuit part and the semiconductor control device are positioned on the opposite side of the brushes from the field winding and the armature winding, they do not readily suffer affects of noise caused by leakage flux from the rotor and stator.

And because a motor/generator unit according to the invention is a motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto wherein the brushes are disposed between the field winding and the armature winding on one side and the control circuit part on the other, a field circuit component mounting part is present between the brushes and the control circuit part, the semiconductor control device and a flywheel diode parallel with the field winding are mounted on this field circuit component mounting part, and the semiconductor control device and the flywheel diode are connected on the field circuit component mounting part, since the heavily heat-producing flywheel diode and semiconductor control device are not present on the control circuit part, temperature increase of the control circuit part can be suppressed. And because the control circuit part and the semiconductor control device are positioned on the opposite side of the brushes from the field winding and the armature winding, they do not readily suffer affects of noise caused by leakage flux from the rotor and stator. And because the semiconductor control device is remote from the control circuit part, the affects of noise on the control circuit part caused by switching of the semiconductor control device can be reduced.

And because a motor/generator unit according to the invention is a motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto wherein a brush holder for holding the brushes has a field circuit component mounting part positioned between the field winding and the armature winding on one side and the control circuit part on the other and the semiconductor control device is mounted on this field circuit component mounting part, since the heavily heat-producing flywheel diode and semiconductor control device are not present on the control circuit part, temperature increase of the control circuit part can be suppressed. And because the brushes and the semiconductor control device, which are constituent elements of the field circuit, are both mounted together on the field circuit component mounting part, the connection wiring between the brushes and the semiconductor control device can be made short and thus rationalization of the wiring is possible. And because the semiconductor control device is remote from the control circuit part, the affects of noise on the control circuit part caused by switching of the semiconductor control device can be reduced.

DETAILED DESCRIPTION OF THE PREFERRED EMBODIMENTS

First Embodiment

Figure 1:
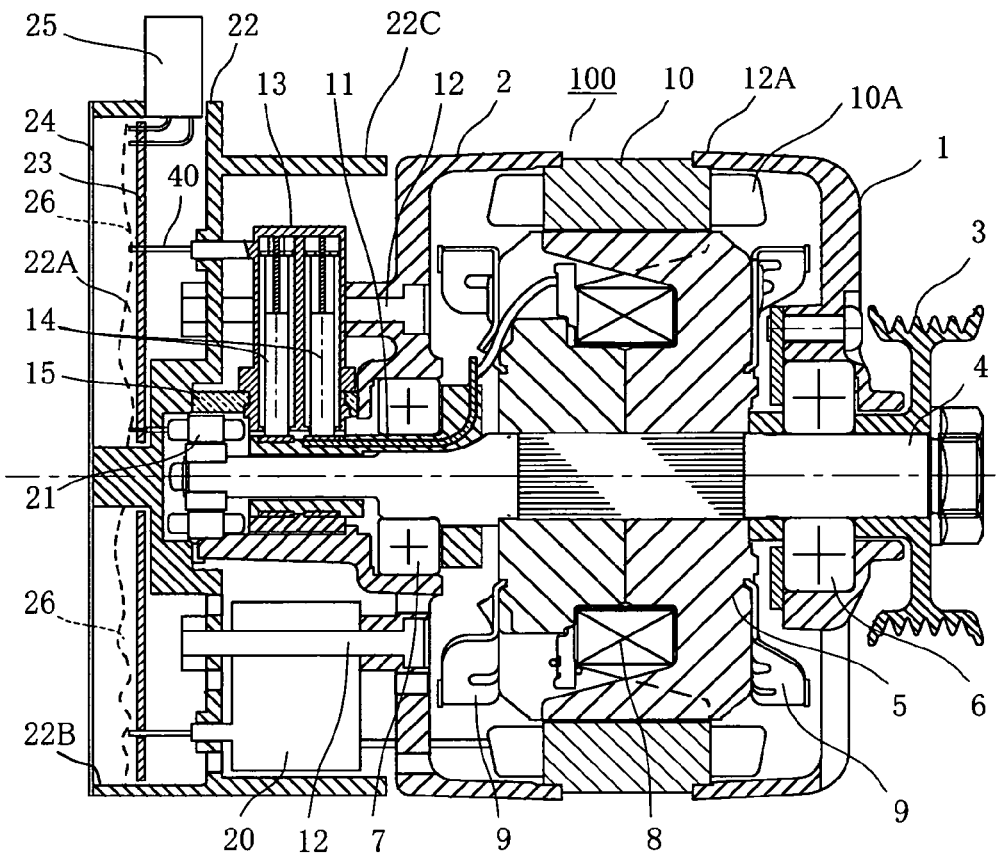
FIG. 1 is a view showing a first embodiment of the invention and is a vertical sectional side view showing an example of an outline construction of an overall motor/generator unit.
Figure 2:
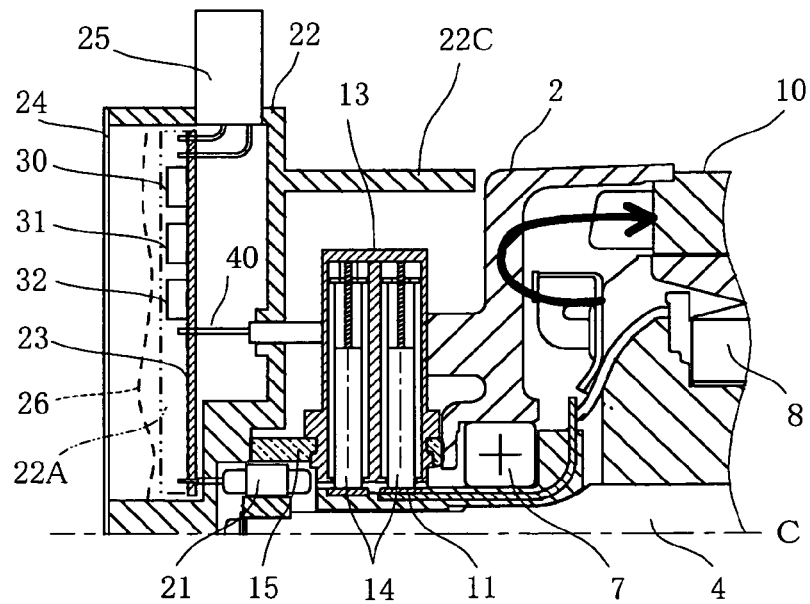
FIG. 2 is a view showing a first embodiment of the invention and is a vertical sectional side view showing a specific example of the structure of a field circuit of FIG. 1.
Figure 3:
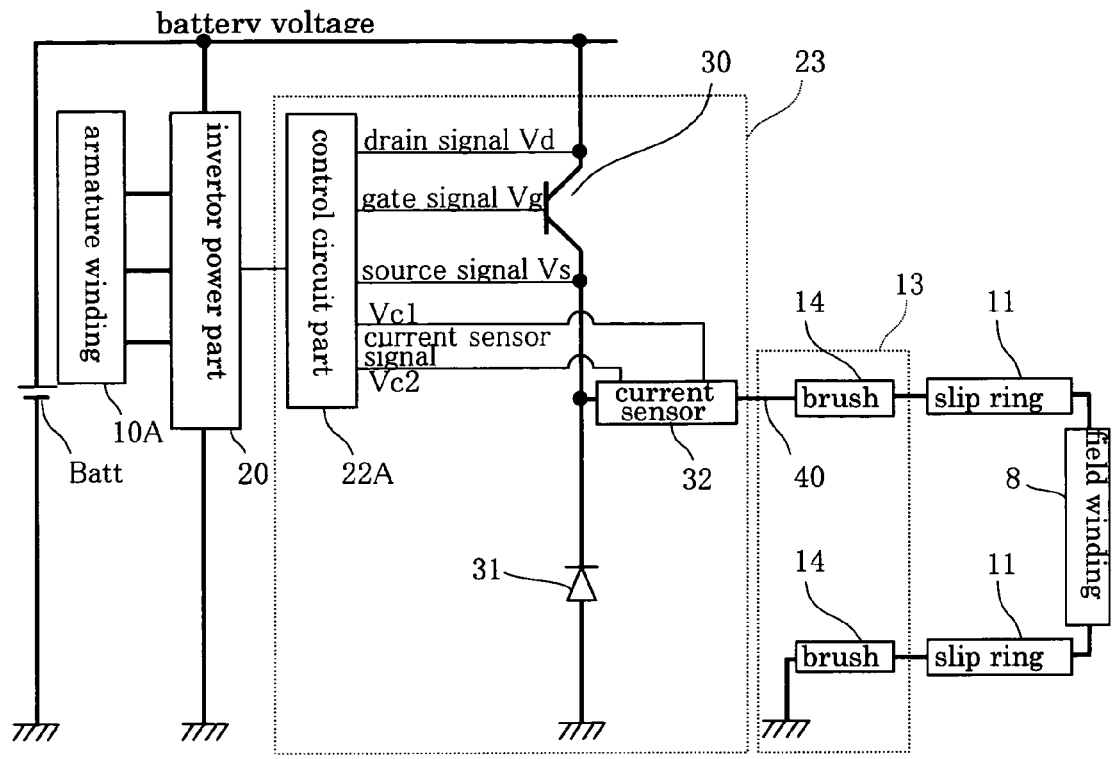
FIG. 3 is a view showing a first embodiment of the invention and is a wiring diagram showing a specific wiring example mainly of a field circuit.
Figure 4:
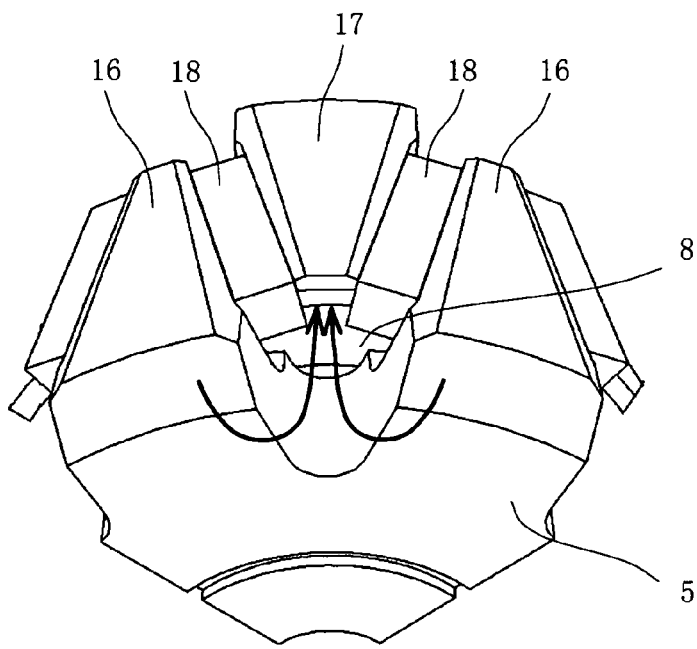
FIG. 4 is a view showing a first embodiment of the invention and is a perspective view of a part of a rotor as seen in the length direction of a shaft from diagonally above.

A first embodiment of the invention will now be described on the basis of FIG. 1 to FIG. 4. FIG. 1 is a vertical sectional side view showing an example of an outline construction of an overall motor/generator unit, FIG. 2 is a vertical sectional side view showing a specific example of the structure of a field circuit of FIG. 1, FIG. 3 is a wiring diagram showing a specific wiring example mainly of a field circuit, and FIG. 4 is a perspective view of a part of a rotor as seen in the length direction of a shaft from diagonally above. The same reference numerals denote the same parts throughout the figures.

First, the outline construction of an overall motor/generator unit will be described, with reference to FIG. 1.

In FIG. 1, a motor/generator unit has a motor/generator unit body part 100 constituting of a case 12A made up of a front bracket 1 and a rear bracket 2 made of aluminum, a shaft 4 mounted inside this case 12A and having a pulley 3 fixed to one end of it in the direction of an axis C (hereinafter called 'the axial direction'), a rotor 5 fixed to this shaft 4, bearings 6, 7 for supporting the rotor 5, a field winding 8 for causing a magnetomotive force to be produced in the rotor 5, fans 9 fixed to the end faces of the rotor 5, and an armature 10 having an armature winding 10A fixed to an inner circumferential face of the case 12A.

The motor/generator unit also has slip rings 11, fixed to the other end of the shaft 4 in the axial direction, for supplying current to the field winding 8; bolts 12 fixed to the rear bracket 2; a brush holder 13 disposed on the outer side, the rear side in the axial direction, of the rear bracket 2 and supported by the bolts 12; a pair of brushes 14 received inside this brush holder 13 and sliding on the outer circumferential surfaces of the slip rings 11; an invertor power part 20 supported by the bolts 12; a rotation sensor 21 disposed in the axial direction rear end of the rear bracket 2; a control circuit part mounting part 22 consisting of a resin case disposed on the axial direction rear side of the brush holder 13 and the invertor power part 20 and supported by the bolts 12; a packing 15 covering the periphery of the brush holder 13 and sandwiched between the rear bracket 2 and the control circuit part mounting part 22; a control board 23, disposed within the control circuit part mounting part 22, on which is constructed a control circuit part 22A for controlling the invertor power part 20 and the field current of a field circuit (that is, controlling the so-called motor/generator body part 100); a cover 24 for closing an opening 22B at the axial direction rear end of the control circuit part mounting part 22; and a connector 25, disposed on the control circuit part mounting part 22, for connecting the wiring on the control board 23 to the external wiring.

The control circuit part 22A and the control board 23 are sealed with a resin 26.

The control board 23 and the brush holder 13 and the motor/generator body part 100 are arranged in a line in the axial direction. Similarly, the control board 23 and the invertor power part 20 and the motor/generator body part 100 are arranged in a line in the axial direction. And, the brush holder 13 and the invertor power part 20 are arranged in a line on a common plane perpendicular to the axial direction and with a predetermined spacing in the circumferential direction about the axis C.

The brush holder 13 and the invertor power part 20 arranged with a predetermined spacing in the circumferential direction are surrounded, with a space therebetween, by an annular cover part 22C made of resin provided on the control circuit part mounting part 22, and are drip-proofed, water-proofed and dust-proofed by this annular cover part 22C. The annular cover part 22C is of approximately the same radius as the case 12A of the motor/generator body part 100 and is disposed coaxially with the case 12A.

Next, a specific example of the structure of a field circuit and a specific wiring example will be described, with reference to FIG. 2 and FIG. 3.

As shown in FIG. 3, the wiring of a field circuit is branched from a line at the same potential as the + potential of a battery Batt passing through a semiconductor device 30 such as a field effect transistor into a path to ground through a flywheel diode 31 and a path to ground through the field winding 8 via the brushes 14 and the slip rings 11.

For the field effect transistor 30, which is the above-mentioned semiconductor control device, to be controlled and driven by the control circuit part 22A, signal lines of a drain signal Vd, a gate signal Vg and a source signal Vs are connected between the control circuit part 22A and the drain, gate and source of the semiconductor control device 30. A current sensor 32 such as a shunt resistance for detecting a field current flowing through the field winding 8 is connected between a respective one of the brushes 14 and the semiconductor control device 30; current detection lines Vc1, Vc2 are connected to output terminals of the current sensor 32, and these current detection lines Vc1, Vc2 are connected to the control circuit part 22A, which is on the same control board 23 as the current sensor 32, by a wiring pattern on the control board 23.

As shown in FIG. 2, the semiconductor control device 30, the flywheel diode 31 and the current sensor 32 are mounted commonly on the control board 23, and the control board 23 is sealed with the resin 26 along with the control circuit part 22A, the semiconductor control device 30, the flywheel diode 31 and the current sensor 32.

To control and drive the field effect transistor 30 constituting the semiconductor control device it is necessary for the drain signal line Vd, the gate signal line Vg and the source signal line Vs to be connected to the control circuit part 22A, and by mounting the field effect transistor 30 constituting the semiconductor control device on the control board 23 it is possible to constitute the drain signal line Vd, the gate signal line Vg, the source signal line Vs and the line from the terminal at the same voltage as the battery Batt with pattern wiring on the control board 23; thus the wiring can be rationalized, and the vibration resistance is superior to ordinary wiring with lead wires.

By also disposing the flywheel diode 31 on the control board 23, it is possible to constitute the line from the field effect transistor to the flywheel diode and the line from the flywheel diode to the ground with a wiring pattern on the control board 23 also, thereby further rationalization of the wiring is possible and vibration resistance superior to that of ordinary wiring with lead wires can be obtained.

And by the current sensor 32 for detecting the field current also being mounted on the control board 23, the current detection lines Vc1, Vc2 for current detection can also be constituted with a wiring pattern on the control board 23, whereby the wiring can be further rationalized and vibration resistance superior to that of ordinary wiring with lead wires can be obtained.

The normal wiring 40 from the brush holder 13 to the control board 23 consists of one line only (a lead wire or a conductor bar or the like other than a wiring pattern).

As shown in FIG. 4, the core of the rotor 5 is made up of facing claw-like poles 16, 17, and to reduce the leakage flux between the facing claw-like poles 16, 17, magnets 18 are disposed between the facing claw-like poles 16, 17.

When the motor/generator body part 100 is rotated to generate electricity, a magnetic flux flows through the rotor core and the stator core, and because the core of the rotor 5 is of a claw-shaped field winding type, a leakage flux from the roots of the claw-like poles 16, 17 to the facing claw-like poles 16, 17 as shown with arrows in FIG. 4 and a leakage flux passing between the iron part of the end of the rotor and the iron part of the end of the stator as shown with an arrow in FIG. 2 exist, and when the main circuit and the signal lines of the field circuit are in the proximity of the rotor and the stator, due to this leakage flux a current flows through the main field circuit and/or currents flow through the signal lines and noise tends to impose on the field circuit; however, in the construction of this first embodiment, because part of the path along which the field current flows and the signal lines are disposed on the control board 23 away from the rotor and the stator, the affect of noise can be made small.

And, the control board 23 can be easily sealed with resin or the like, and it is possible to prevent electrolytic corrosion caused by exposure of the parts and wiring on the control board 23 to water from outside and insulate them easily.

Second Embodiment

Figure 5:
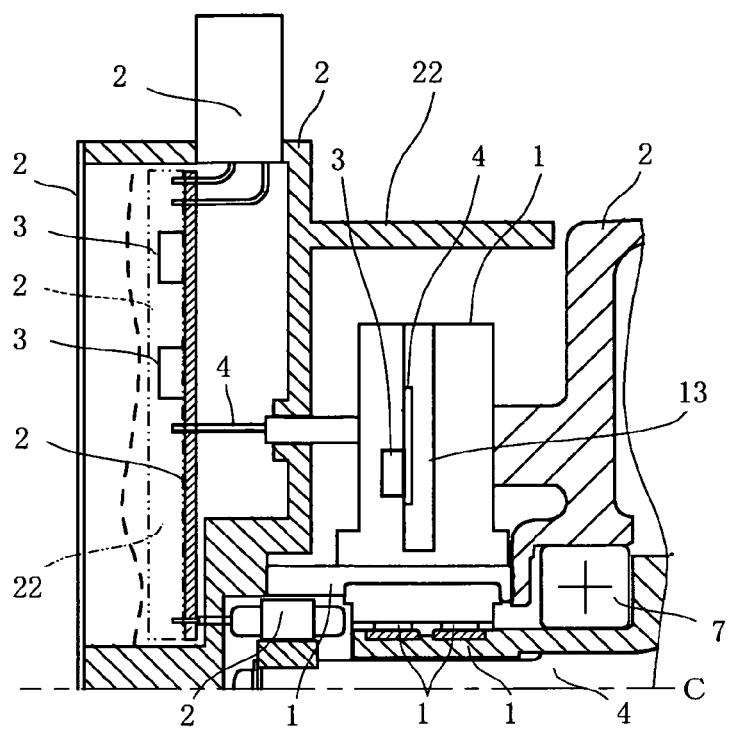
FIG. 5 is a view showing a second embodiment of the invention and is a vertical sectional side view showing a specific example of the structure of a field circuit.
Figure 6:
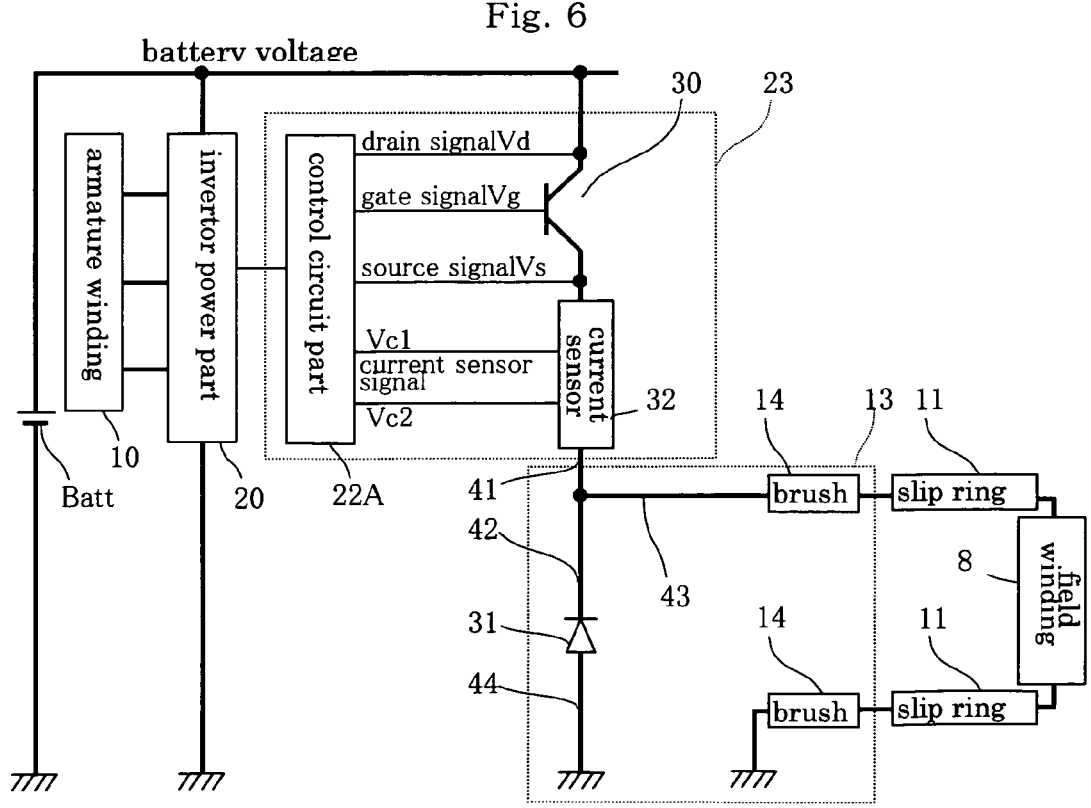
FIG. 6 is a view showing a second embodiment of the invention and is a wiring diagram showing a specific wiring example mainly of a field circuit.
Figure 7:
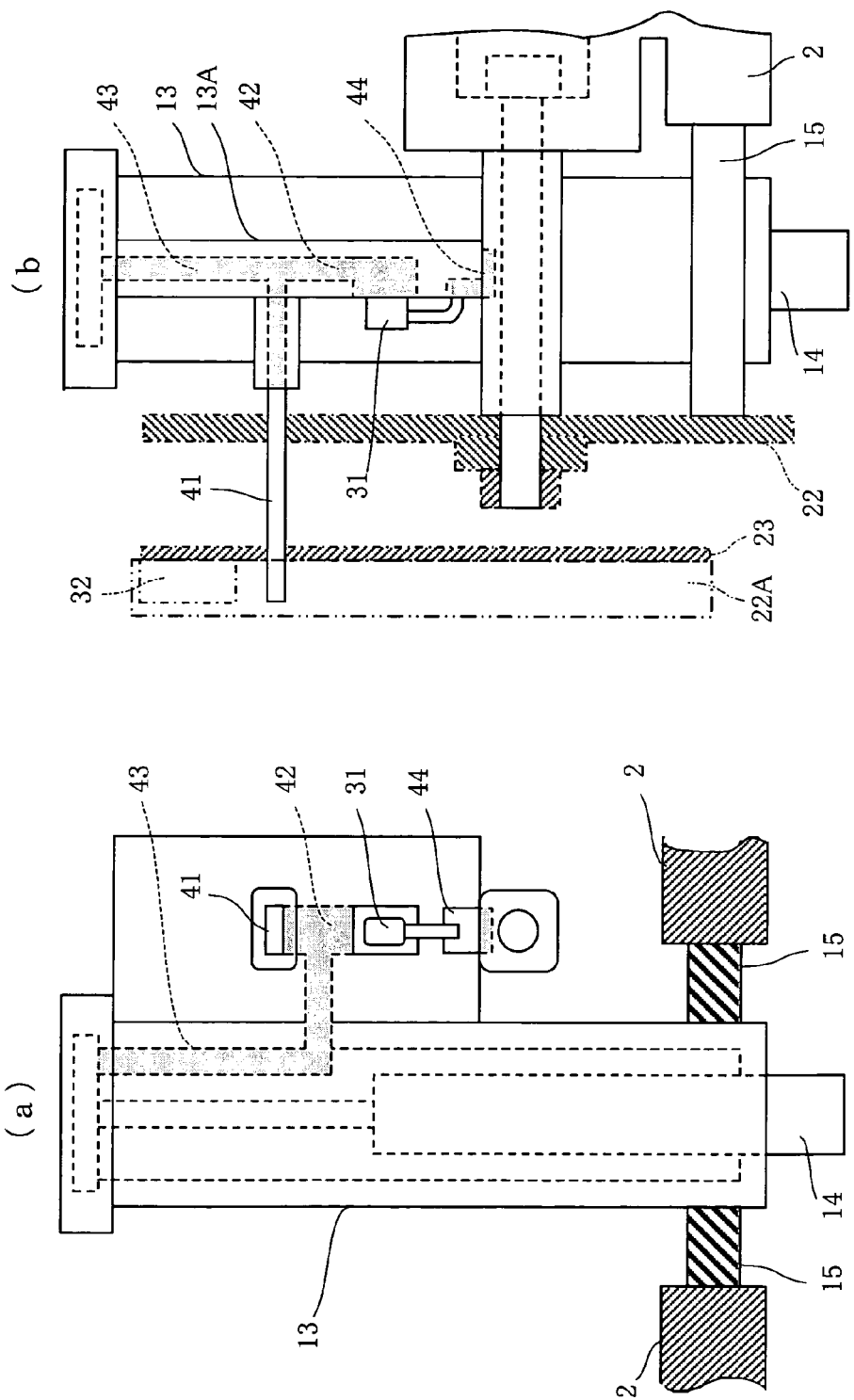
FIGS. 7A and 7B are views showing a second embodiment of the invention and are enlarged views showing a more specific example of the structure of a field circuit, FIG. 7A being a rear view from an axial direction rear side and FIG. 7B a side view with a part shown in section.

A second embodiment of the invention will now be described, with reference FIG. 5 to FIG. 7. FIG. 5 is a vertical sectional side view showing a specific example of the structure of a field circuit; FIG. 6 is a wiring diagram showing a specific wiring example mainly of a field circuit; and FIGS. 7A and 7B are enlarged views showing a more specific example of the structure of a field circuit, FIG. 7A being a rear view from an axial direction rear side and FIG. 7B a side view with a part shown in section. In FIG. 5 to FIGS. 7A and 7B, parts the same as or equivalent to parts in FIG. 1 to FIG. 4 discussed above have been given the same reference numerals as in FIG. 1 to FIG. 4, and in the following description pertaining to a second embodiment mainly the parts different from the first embodiment of the invention presented in FIG. 1 to FIG. 4 will be described, and other description will be omitted.

In this second embodiment, the field effect transistor or other semiconductor control device 30 is on the control board 23, and the flywheel diode 31 is mounted on a plate-form field circuit component mounting part 13A provided projecting in the circumferential direction integrally with the brush holder 13. The wiring between the respective brush 14 and the flywheel diode 31 is constituted with connection terminals 42, 43 molded into the brush holder 13 and the field circuit component mounting part 13A. The control board 23 and the brush holder 13 are connected with a single connection terminal (wire) 41. The + pole of the flywheel diode 31 is grounded by a connection terminal (wire) 44 molded into the field circuit component mounting part 13A and connected to the rear bracket 2. The current sensor 32 for detecting the field current such as a shunt resistance is mounted on the control board 23, at the output terminals of the current sensor 32 there are the current detection lines Vc1, Vc2 for detecting the current, and these current detection lines Vc1, Vc2 are connected to the control circuit part 22A on the same control board 23 as the current sensor 32 by a wiring pattern of the control board 23.

Because the semiconductor control device 30 such as a field effect transistor and the current sensor 32 are on the control board 23, the drain signal line Vd, the gate signal line Vg, the source signal line Vs, the current detection lines Vc1, Vc2 for current detection of the current sensor 32, and the wiring from the terminal at the same voltage as the battery Batt can be constituted by pattern wiring on the control board 23, and thus the wiring can be rationalized. And, as a result of the flywheel diode 31 being mounted on a field circuit component mounting part 13A of the brush holder 13, because a single connection terminal (wire) 41 from the brush holder 13 to the control board 23 will suffice, the wiring can be rationalized and vibration resistance is excellent.

And, in this second embodiment also, because part of the path along which the field current flows and the signal lines are disposed on the control board 23 away from the rotor and the stator, the affect of noise can be made small.

And, because the flywheel diode 31, which produces a lot of heat in such a winding specification that a field current of several Amperes to several tens of Amperes flows, is not mounted on the control board 23, temperature increase of the control board 23 can be suppressed.

Also, as in the first embodiment described above, the control board 23 can be easily sealed with resin or the like, and it is possible to prevent electrolytic corrosion caused by exposure of the parts and wiring on the control board 23 to water from outside and insulate them easily.

Third Embodiment

Figure 8:
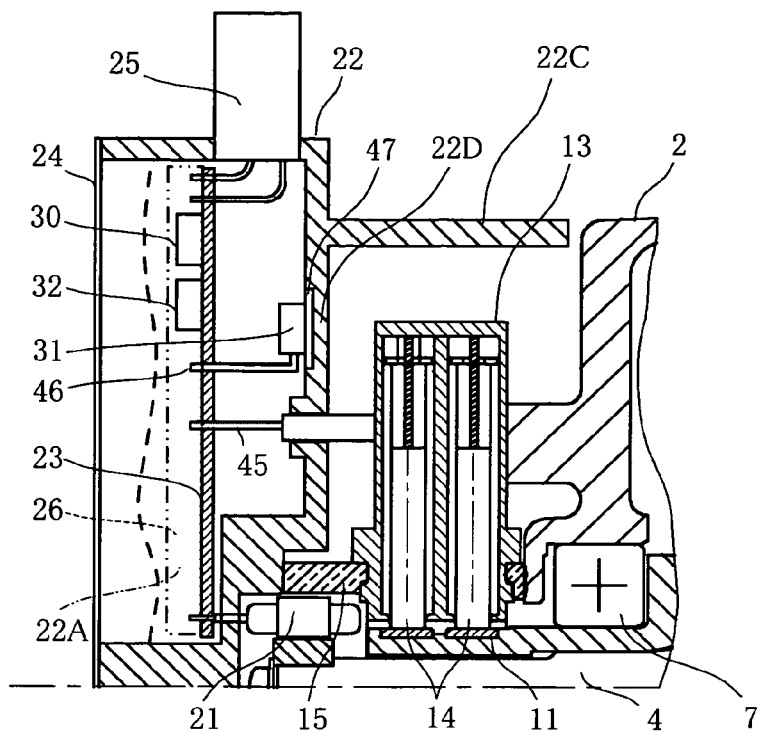
FIG. 8 is a view showing a third embodiment of the invention and is a wiring diagram showing a specific example of the structure of a field circuit.
Figure 9:
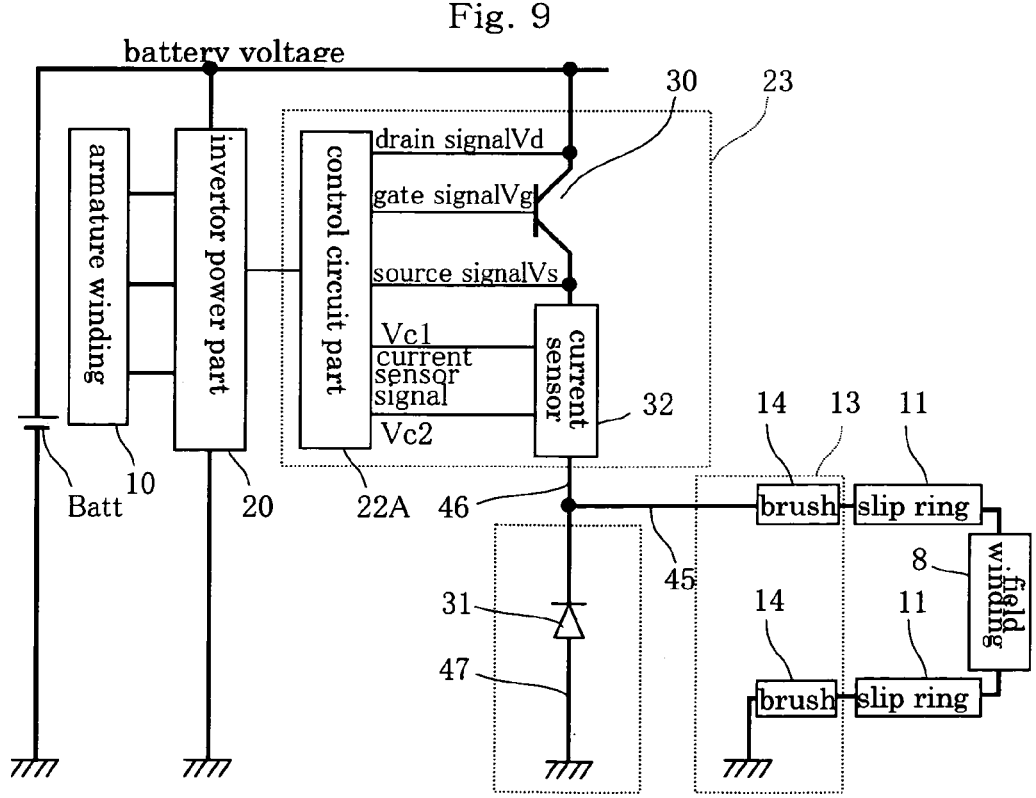
FIG. 9 is a view showing a third embodiment of the invention and is a wiring diagram showing a specific wiring example mainly of a field circuit.

A third embodiment will now be described, with reference to FIG. 8 and FIG. 9. FIG. 8 is a vertical sectional side view showing a specific example of a structure of a field circuit, and FIG. 9 is a wiring diagram showing a specific wiring example of mainly a field circuit. In FIG. 8 and FIG. 9, parts the same as or equivalent to parts in FIG. 1 to FIG. 7B discussed above have been given the same reference numerals as in FIG. 1 to FIG. 7B, and in the following description pertaining to a third embodiment mainly the parts different from the first and second embodiments of the invention presented in FIG. 1 to FIG. 7B will be described, and other description will be omitted.

In this third embodiment, the field effect transistor or other semiconductor control device 30 is on the control board 23. And, a wall part on the brush holder 13 side of the control circuit part mounting part 22 supported by bolts is made a field circuit component mounting part 22D, and the flywheel diode 31 is mounted on this field circuit component mounting part 22D. The flywheel diode 31 is connected to the control board 23 by a connection terminal (wire) 46, and is grounded by a connection terminal (wire) 47 on the field circuit component mounting part 22D. The current sensor 32 for detecting the field current is mounted on the control board 23, at the output terminals of the current sensor 32 there are the current detection lines Vc1, Vc2 for detecting the current, and these current detection lines Vc1, Vc2 are connected to the control circuit part 22A on the same control board 23 as the current sensor 32 by a wiring pattern on the control board 23.

Because the semiconductor control device 30 such as a field effect transistor and the current sensor 32 are on the control board 23, the drain signal line Vd, the gate signal line Vg, the source signal line Vs, the current detection lines Vc1, Vc2 for current detection of the current sensor 32, and the wiring from the terminal at the same voltage as the battery Batt can be constituted with pattern wiring on the control board 23, and the wiring can be rationalized. And, the connection terminal (wire) 46 connecting the flywheel diode 31 and the control board 23 is also short, and vibration resistance is excellent.

And, in this embodiment also, because part of the path along which the field current flows and the signal lines are disposed on the control board 23 away from the rotor and the stator, the affect of noise can be made small.

And, because the flywheel diode 31, which produces a lot of heat in such a winding specification that a field current of several Amperes to several tens of Amperes flows, is not mounted on the control board 23, temperature increase of the control board 23 can be suppressed, and furthermore because the flywheel diode 31 is not mounted on the brush holder 13, the flywheel diode 31 does not receive any heat from the brushes 14 and temperature increase of the flywheel diode 31 can also be suppressed.

The semiconductor control device 30 such as a field effect transistor can also be mounted on the field circuit component mounting part 22D provided on the brush holder 13 side wall part of the control circuit part mounting part 22 supported by bolts, and in this case, because the heavily heat-producing flywheel diode 31 and semiconductor control device 30 are not mounted on the control circuit part 22A, temperature increase of the control board 23 can be suppressed further.

And, because the control circuit part and the semiconductor control device are positioned on the opposite side of the brushes from the field winding and the armature winding, they do not readily suffer affects of noise caused by leakage currents from the rotor and the stator.

Fourth Embodiment

Figure 10:
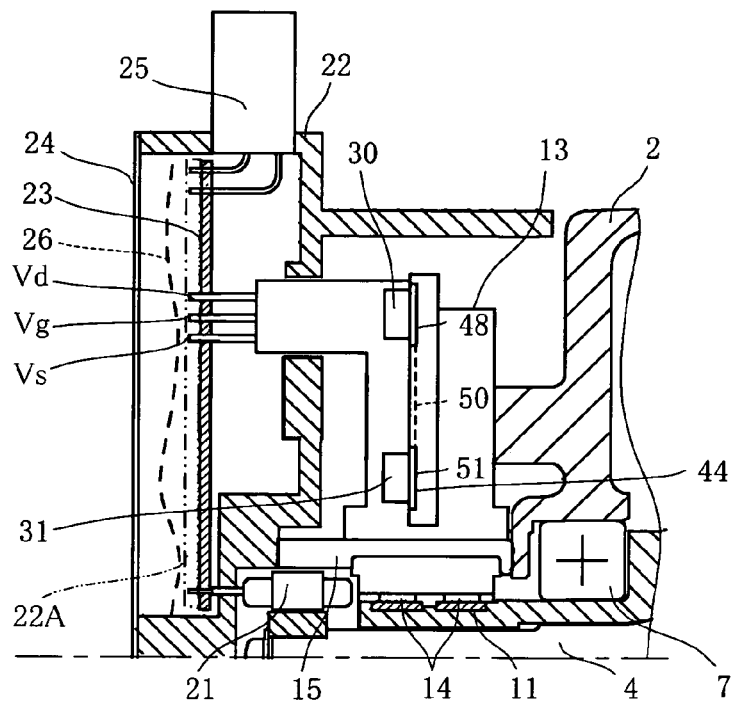
FIG. 10 is a view showing a fourth embodiment of the invention and is a vertical sectional side view showing a specific example of the structure of a field circuit.
Figure 11:
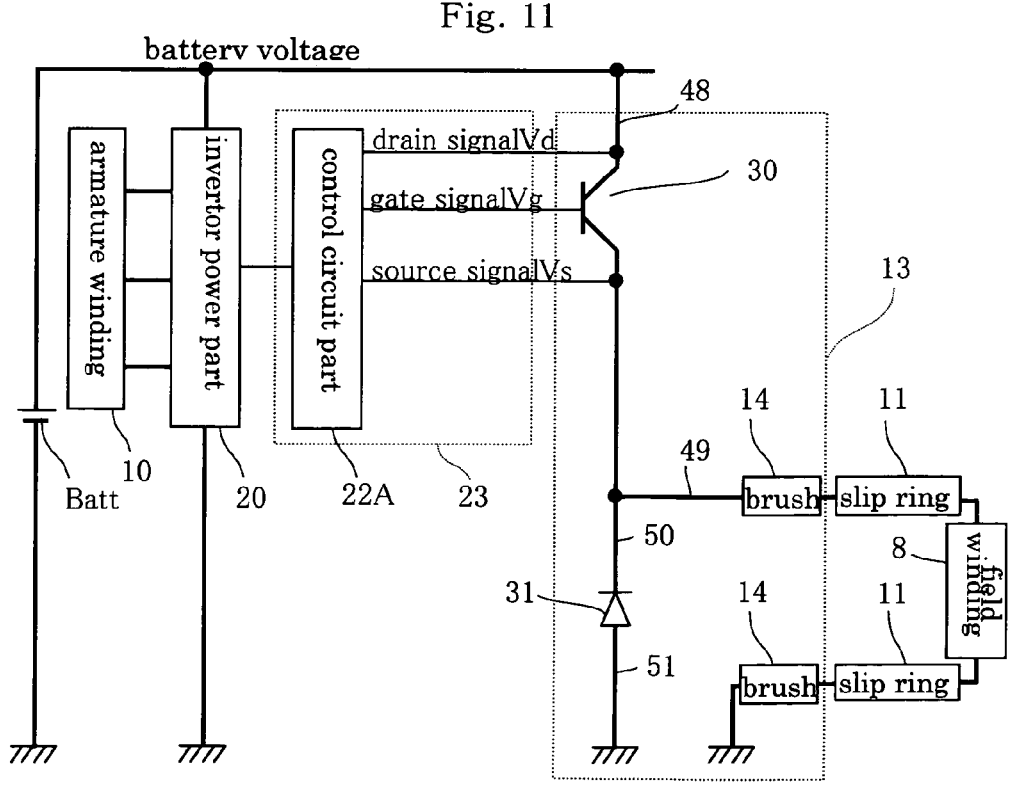
FIG. 11 is a view showing a fourth embodiment of the invention and is a wiring diagram showing a specific wiring example mainly of a field circuit.
Figure 12:
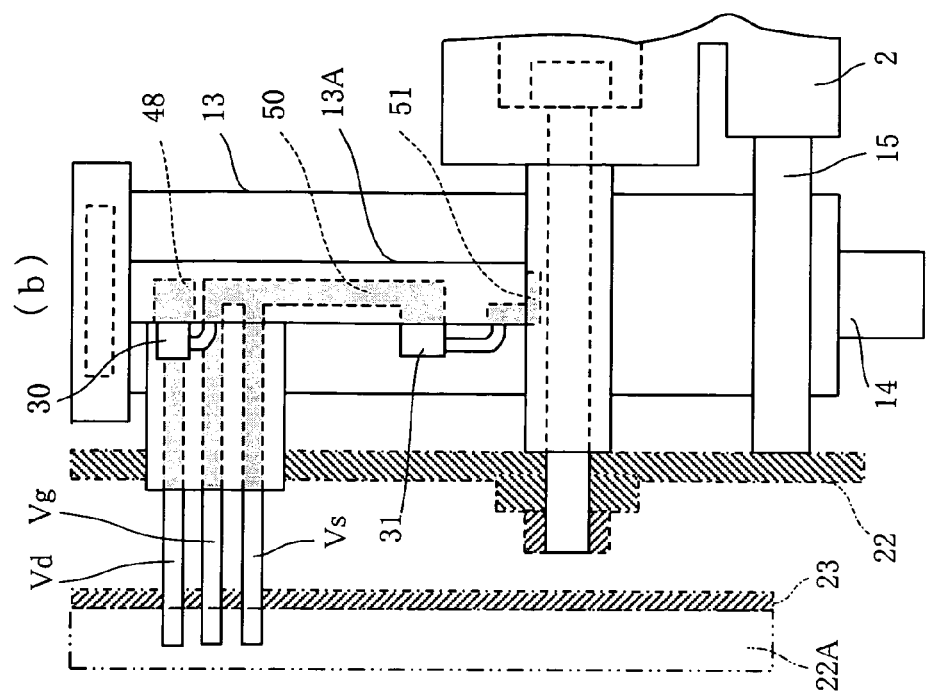
FIGS. 12A and 12B are views showing a fourth embodiment of the invention and are enlarged views showing a more specific example of the structure of a field circuit, FIG. 12A being a rear view from an axial direction rear side and FIG. 12B a side view with a part shown in section.
Figure 12:
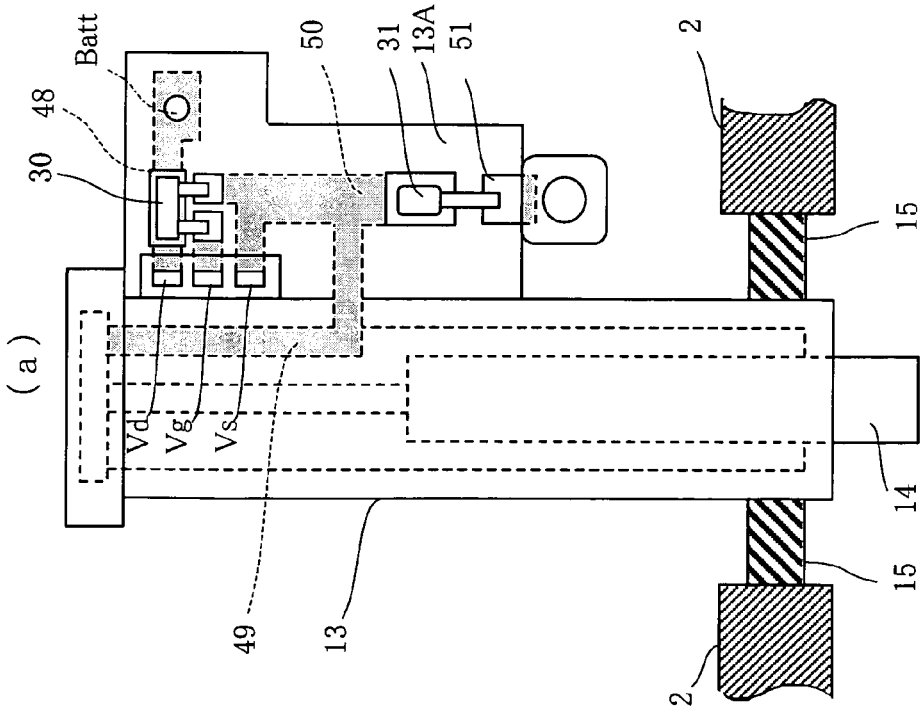

A fourth embodiment will now be described, with reference to FIG. 10 to FIG. 12B. FIG. 10 is a vertical sectional side view showing a specific example of the structure of a field circuit; FIG. 11 is a wiring diagram showing a specific wiring example of mainly a field circuit; and FIGS. 12A and 12B are enlarged views showing a more specific example of the structure of a field circuit, FIG. 12A being a rear view from an axial direction rear side and FIG. 12B a side view with a part shown in section. In FIG. 10 to FIG. 12B, parts the same as or equivalent to parts in FIG. 1 to FIG. 9 discussed above have been given the same reference numerals as in FIG. 1 to FIG. 9, and in the following description pertaining to a fourth embodiment mainly the parts different from the first through third embodiments of the invention presented in FIG. 1 to FIG. 9 will be described, and other description will be omitted.

In this fourth embodiment, the semiconductor control device 30 such as a field effect transistor and the flywheel diode 31 are both disposed on the brush holder 13, and the semiconductor control device 30 and the flywheel diode 31, which are components of the path along which the field current flows, are connected by a connection terminal (wire) 50 inside the brush holder 13.

A drain signal connection terminal (wire) Vd, a gate signal connection terminal (wire) Vg and source signal connection terminal (wire) Vs for controlling and driving the semiconductor control device 30 such as a field effect transistor are connected to the control board 23 from a field circuit component mounting part 13A of the brush holder 13. In this way, wiring and components of the path along which the field current flows are disposed on the field circuit component mounting part 13A of the brush holder 13.

By the wiring and component connections along which the field current flows being constituted with connection terminals 48, 49, 50, 51 on the field circuit component mounting part 13A of the brush holder 13 like this, the number of connections in the path along which the field current flows can be reduced, that is, the wiring can be rationalized, and vibration resistance is excellent.

And, because the flywheel diode 31, which produces a lot of heat in such a winding specification that a field current of several Amperes to several tens of Amperes flows, is not mounted on the control board 23, temperature increase of the control board 23 can be suppressed. And, because the semiconductor control device 30 is away from the control circuit part 22A, the affect of noise on the wiring and components of the control circuit part 22A (for example the signal lines of the rotation sensor 21 and so on) caused by the switching of the semiconductor control device 30 can be reduced.

Fifth Embodiment

Figure 13:
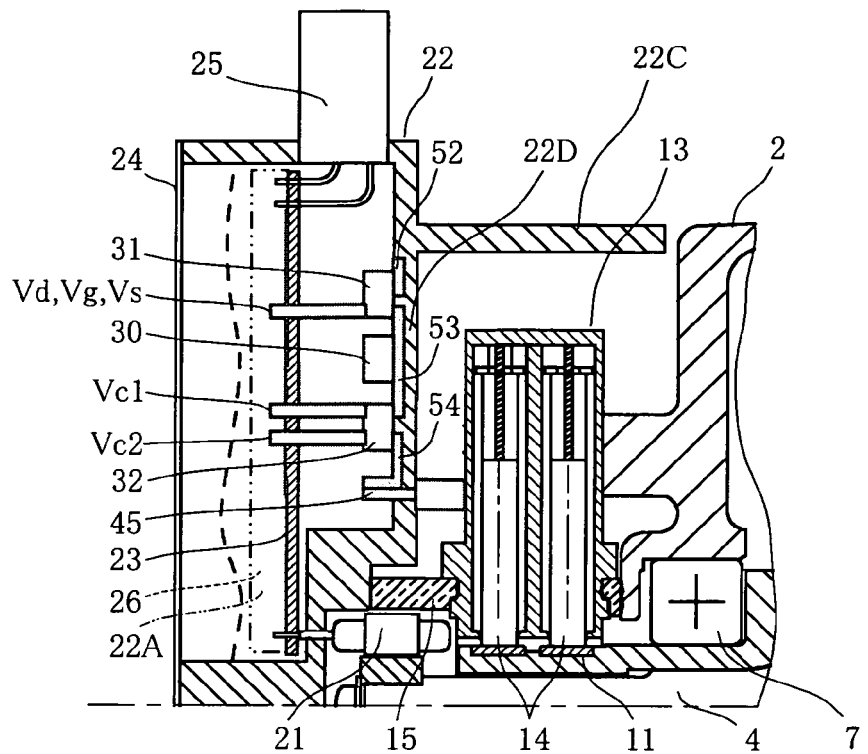
FIG. 13 is a view showing a fifth embodiment of the invention and is a vertical sectional side view showing a specific example of the structure of a field circuit.
Figure 14:
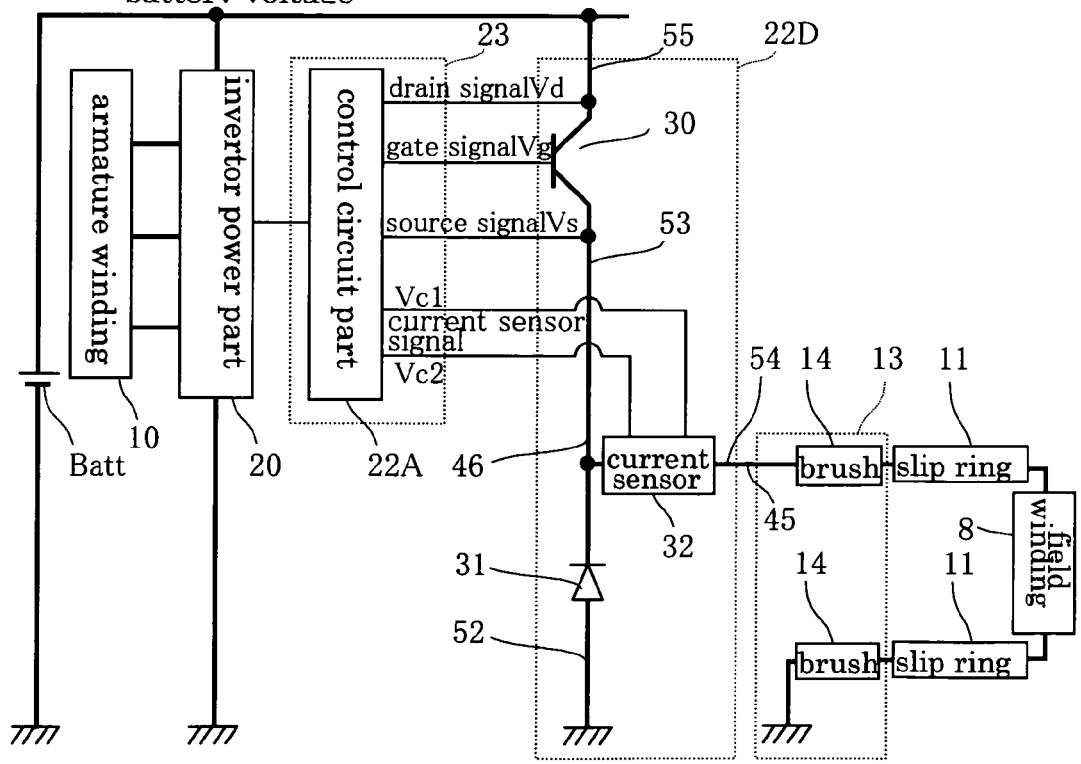
FIG. 14 is a view showing a fifth embodiment of the invention and is a wiring diagram showing a specific wiring example mainly of a field circuit.
Figure 15:
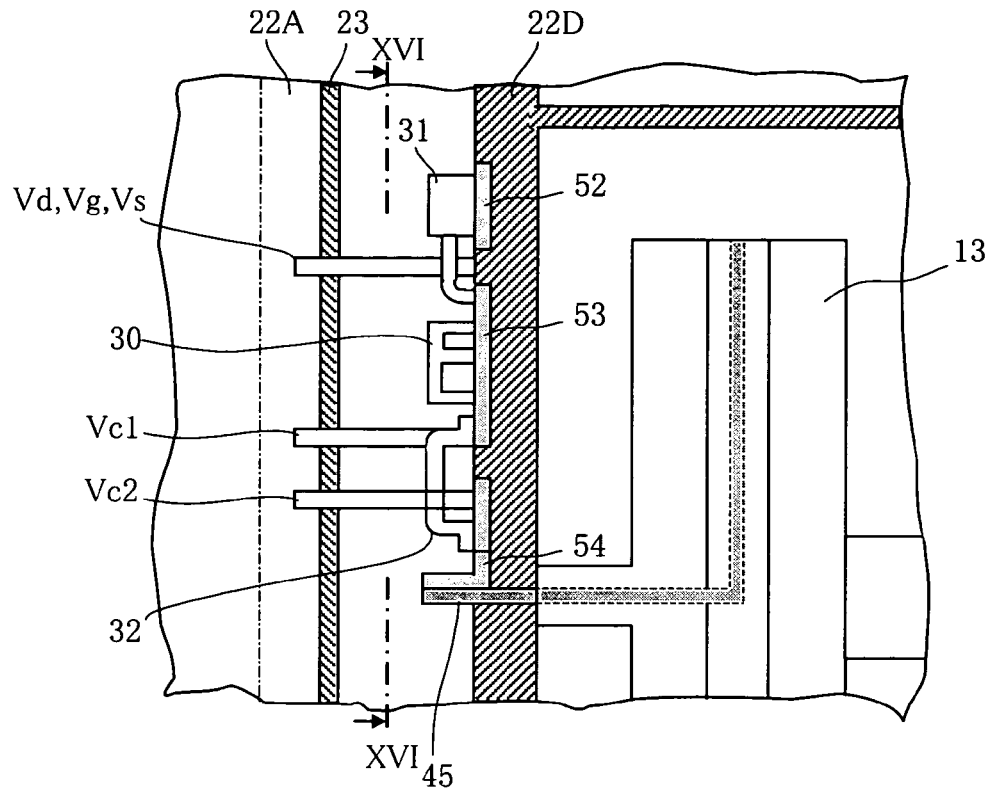
FIG. 15 is a view showing a fifth embodiment of the invention and is a vertical sectional side view showing a main part of FIG. 13 enlarged.
Figure 16:
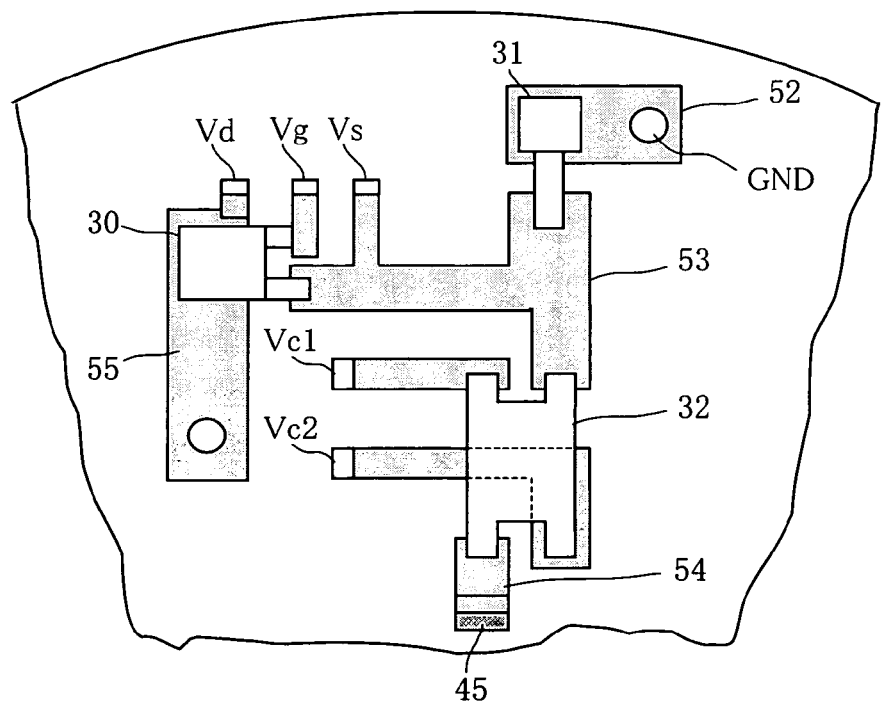
FIG. 16 is a view showing a fifth embodiment of the invention and is a rear view of a main part seen from the line XVI-XVI of FIG. 15 in the direction of the arrows.

A fifth embodiment of the invention will now be described, with reference to FIG. 13 to FIG. 16. FIG. 13 is a vertical sectional side view showing a specific example of the structure of a field circuit, FIG. 14 is a wiring diagram showing a specific wiring example of mainly a field circuit, FIG. 15 is a vertical sectional side view showing a main part of FIG. 13 enlarged, and FIG. 16 is a rear view of a main part seen from the line XVI-XVI in the direction of the arrows in FIG. 15. In FIG. 13 to FIG. 16, parts the same as or equivalent to parts in FIG. 1 to FIG. 12 discussed above have been given the same reference numerals as in FIG. 1 to FIG. 12, and in the following description pertaining to a fifth embodiment mainly the parts different from the first through fourth embodiments of the invention presented in FIG. 1 to FIG. 12 will be described, and other description will be omitted.

In this fifth embodiment, a field circuit component mounting part 22D is present between the brush holder 13 and the control circuit part 22A, and the semiconductor control device 30, the flywheel diode 31 and the current sensor 32 are disposed on this field circuit component mounting part 22D.

The source electrode of the semiconductor control device 30 and the cathode of the flywheel diode 31 and one of the input terminals of the current sensor 32 are connected by a connection terminal 53 inside the field circuit component mounting part 22D.

The drain electrode of the semiconductor control device 30 is connected to a connection terminal 55 and to the + side of the battery Batt via this connection terminal 55, and by way of the connection terminal 55 and a drain signal connection terminal (wire) Vd it is connected to the control circuit part 22A on the control board 23. The source electrode of the semiconductor control device 30 is connected to the control circuit part 22A on the control board 23 by way of the connection terminal 53 and a source signal connection terminal (wire) Vs. The gate electrode of the semiconductor control device 30 is connected to the control circuit part 22A on the control board 23 by way of a gate signal connection terminal (wire) Vg.

The anode of the flywheel diode 31 is grounded by way of a connection terminal (wire) 52 inside the field circuit component mounting part 22D.

The other input terminal of the current sensor 32 is connected by way of a connection terminal (wire) 54 inside the field circuit component mounting part 22D to a connection terminal (wire) 45 connected to the respective brush 14 inside the brush holder 13. One of the output terminals of the current sensor 32 is connected to the control circuit part 22A on the control board 23 by way of a current detection connection terminal Vc1. The other output terminal of the current sensor 32 is connected to the control circuit part 22A on the control board 23 by way of a current detection connection terminal Vc2.

In other words, the source signal connection terminal (wire) Vs, the gate signal connection terminal (wire) Vg, the drain signal connection terminal (wire) Vd, the current detection connection terminal Vc1 of the current sensor 32 and the current detection connection terminal Vc2 of the current sensor 32 are connected from the field circuit component mounting part 22D to the control circuit part 22A on the control board 23.

In this way, the wiring (the connection terminals Vs, Vg, Vd, Vc1, Vc2) and components (the semiconductor control device 30, the flywheel diode 31, the current sensor 32) of the path along which the field current flows are disposed on the field circuit component mounting part 22D.

In this fifth embodiment, because it has the construction described above, the above-mentioned wiring and components of the path along which the field current flows can be connected in the field circuit component mounting part 22D positioned between the brush holder 13 and the control circuit part 22A, and also, the connection terminal 45 from the brushes 14 to the field circuit component mounting part 22D, the drain signal connection terminal (wire) Vd, the gate signal connection terminal (wire) Vg and source signal connection terminal (wire) Vs from the semiconductor control device 30 to the control circuit part 22A on the control board 23, and the current detection connection terminals Vc1, Vc2 for detecting the current can be made short, and the vibration resistance is excellent.

And, in this fifth embodiment, by means of the construction described above, because the heavily heat-producing flywheel diode 31 and semiconductor control device 30 are not mounted on the control circuit part 22A on the control board 23, temperature rise of the control board 23 caused by heating of the flywheel diode 31 and the semiconductor control device 30 can be suppressed.

Furthermore, in this fifth embodiment, by means of the construction described above, because the semiconductor control device 30 is remote from the control circuit part 22A, the affect of noise on the wiring and components of the control circuit part 22A (for example the signal lines of the rotation sensor 21 and so on) caused by the switching of the semiconductor control device 30 can be reduced. And, because it is remote from the rotor and the stator, it does not readily suffer affects of noise caused by leakage flux of the rotor and stator.

What is claimed is:

1. A motor/generator unit in which a motor/generator body part, having a field winding supplied with electricity via brushes and current-controlled by a semiconductor control device controlled by a control circuit part and an armature winding current-controlled by an invertor power circuit part controlled by the control circuit part, has the invertor power circuit part and the control circuit part mounted thereto, wherein the brushes are disposed between the field winding and the armature winding on one side and the control circuit part on the other and the semiconductor control device is mounted on a control circuit part mounting part to which the control circuit part is mounted.

2. A motor/generator unit according to claim 1, wherein the control circuit part is constituted on and the semiconductor control device mounted on a control board received in a case part disposed on the opposite side of the brushes from the field winding and the armature winding, and the control circuit part and the semiconductor control device are connected by this control board.

3. A motor/generator unit according to claim 2, wherein the control circuit part and the semiconductor control device are sealed with resin along with the control board.

4. A motor/generator unit according to claim 1, wherein a current sensor for detecting a field current and supplying a corresponding output to the control circuit part is mounted on the control circuit part mounting part and sealed along with the control board.

5. A motor/generator unit according to claim 3, wherein a current sensor for detecting a field current and supplying a corresponding output to the control circuit part is mounted on the control circuit part mounting part and sealed along with the control board.

6. A motor/generator unit according to claim 1, wherein a flywheel diode parallel with the field winding is mounted on the control circuit part mounting part, and the semiconductor control device and the flywheel diode are connected by the control circuit part mounting part.

7. A motor/generator unit according to claim 5, wherein a flywheel diode parallel with the field winding is mounted on the control circuit part mounting part, and the semiconductor control device and the flywheel diode are connected by the control circuit part mounting part.

8. A motor/generator unit according to claim 6, wherein the control circuit part is constituted on and the semiconductor control device mounted on a control board received in a case part disposed on the opposite side of the brushes from the field winding and the armature winding, and by this control board the control circuit part and the semiconductor control device are connected and the semiconductor control device and the flywheel diode are connected.

9. A motor/generator unit according to claim 7, wherein the control circuit part is constituted on and the semiconductor control device mounted on a control board received in a case part disposed on the opposite side of the brushes from the field winding and the armature winding, and by this control board the control circuit part and the semiconductor control device are connected and the semiconductor control device and the flywheel diode are connected.

10. A motor/generator unit according to claim 1 through 4, wherein a flywheel diode parallel with the field winding is mounted on a brush holder for holding the brushes.

11. A motor/generator unit according to claim 5, wherein a flywheel diode parallel with the field winding is mounted on a brush holder for holding the brushes.

12. A motor/generator unit according to claim 1, wherein a field circuit component mounting part is present between a brush holder for holding the brushes and the control circuit part, and a flywheel diode parallel with the field winding is mounted on this field circuit component mounting part.

13. A motor/generator unit according to claim 5, wherein a field circuit component mounting part is present between a brush holder for holding the brushes and the control circuit part, and a flywheel diode parallel with the field winding is mounted on this field circuit component mounting part.

14. A motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto, wherein the brushes are disposed between the field winding and the armature winding on one side and the control circuit part on the other, a field circuit component mounting part is present between the brushes and the control circuit part, the semiconductor control device and a flywheel diode parallel with the field winding are mounted on this field circuit component mounting part, and the semiconductor control device and the flywheel diode are connected on the field circuit component mounting part.

15. A motor/generator unit in which a motor/generator body part having a field winding supplied with electricity via brushes and current-controlled by a semiconductor control device controlled by a control circuit part and an armature winding current-controlled by an invertor power circuit part controlled by the control circuit part has the invertor power circuit part and the control circuit part mounted thereto, wherein a brush holder for holding the brushes has a field circuit component mounting part positioned between the field winding and the armature winding on one side and the control circuit part on the other, and the semiconductor control device is mounted on this field circuit component mounting part.

16. A motor/generator unit according to claim 15, wherein a flywheel diode parallel with the field winding is mounted on the field circuit component mounting part, and the semiconductor control device and the flywheel diode are connected on the field circuit component mounting part.

* * * * *